United States Patent
Don et al.

(10) Patent No.: US 11,481,286 B2
(45) Date of Patent: Oct. 25, 2022

(54) STORAGE BASED FILE FTP

(71) Applicant: EMC IP Holding Company LLC, Hopkinton, MA (US)

(72) Inventors: Arieh Don, Newton, MA (US); Stephen D. Smaldone, Woodstock, CT (US); Vinay G. Rao, Bangalore (IN); Sanjib Mallick, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 9 days.

(21) Appl. No.: 16/794,529

(22) Filed: Feb. 19, 2020

(65) Prior Publication Data

US 2021/0255936 A1    Aug. 19, 2021

(51) Int. Cl.
    G06F 16/11    (2019.01)
    G06F 11/14    (2006.01)
    G06F 3/06    (2006.01)

(52) U.S. Cl.
    CPC .......... *G06F 11/1469* (2013.01); *G06F 3/064* (2013.01); *G06F 3/067* (2013.01); *G06F 3/0619* (2013.01); *G06F 3/0653* (2013.01); *G06F 3/0665* (2013.01); *G06F 11/1451* (2013.01); *G06F 11/1461* (2013.01); *G06F 11/1464* (2013.01)

(58) Field of Classification Search
    CPC .. G06F 11/1451; G06F 11/1446; G06F 16/01; G06F 11/1469; G06F 11/1464; G06F 3/0619; G06F 11/1461
    See application file for complete search history.

(56) References Cited

U.S. PATENT DOCUMENTS

| | | | | |
|---|---|---|---|---|
| 10,049,115 | B1* | 8/2018 | Payne | G06F 11/1458 |
| 10,409,687 | B1* | 9/2019 | Bono | G06F 11/2069 |
| 10,795,588 | B1* | 10/2020 | Yadav | G06F 3/0619 |
| 10,877,931 | B1* | 12/2020 | Nadiminti | G06F 16/1787 |
| 2021/0042263 | A1* | 2/2021 | Zdornov | G06F 16/128 |
| 2021/0049079 | A1* | 2/2021 | Kumar | G06F 9/45558 |
| 2021/0406134 | A1* | 12/2021 | Yoshii | G06F 11/1464 |
| 2022/0050858 | A1* | 2/2022 | Karr | G06F 11/1458 |

* cited by examiner

*Primary Examiner* — Matthew M Kim
*Assistant Examiner* — Kyle Emanuele
(74) *Attorney, Agent, or Firm* — Muirhead and Saturnelli, LLC (57) ABSTRACT

Transferring files directly from a storage system to a backup storage system includes determining identifiers for blocks on the storage system that correspond to files that are to be backed up, providing the identifiers for the blocks to the storage system, and the storage system pushing the blocks indicated by the identifiers directly from the storage system to the backup storage system. The identifiers may be logical block addresses. Determining the logical block addresses may vary according to a file system for files that are to be backed up. Determining the logical block address may include determining an inode value for each of the files that are to be backed up or may include determining a logical cluster number for each of the files that are to be backed up. The backup storage system may include a media server and a storage device.

19 Claims, 6 Drawing Sheets

STORAGE BASED FILE FTP

TECHNICAL FIELD

This application relates to the field of computer systems and storage systems therefor and, more particularly, to the field of backup up data for storage systems.

BACKGROUND OF THE INVENTION

Host processor systems may store and retrieve data using a storage system containing a plurality of host interface units (I/O modules), disk drives, and disk interface units (disk adapters). The host systems access the storage systems through a plurality of channels provided therewith. Host systems provide data and access control information through the channels to the storage system and the storage system provides data to the host systems also through the channels. The host systems do not address the disk drives of the storage system directly, but rather, access what appears to the host systems as a plurality of logical disk units or logical devices. The logical devices may or may not correspond to any one of the actual disk drives. Allowing multiple host systems to access the single storage system allows the host systems to share data stored therein among different host processor systems.

Backing up data is useful to protect against hardware failure, data loss, data corruption, etc. In the case of a storage system, data backups are provided by using a host to read data from the storage system and transfer the data to a backup storage system, which may include a media server to facilitate backup operations. A host is used because backup operations take advantage of the file structure of stored data; the storage system, by itself, may not contain information necessary to access the data stored thereon using any file system. Generally, the host system presents block based storage operations to a storage system while the host maintains the file system and reads and writes specific blocks of the storage system based on the file system. Thus, backing up data of the storage system on a per file basis requires a host to know which blocks of data of the storage system correspond to which files.

A drawback to using a host to back up a storage system is that the host may become a bottleneck for the backup operation. Part of the bottleneck is due to the relatively slow speed of the FTP connection (or similar) between the host used for backup and the backup storage system. An FC connection would be much quicker, but many backup storage systems do not directly provide FC capability. Moreover, irrespective of the speed of data transfer between the host and the backup storage system, having the host between the storage system and the backup storage system adds overhead. It would be more efficient to be able to transfer files directly between the storage system and the backup storage system, but neither the storage system nor the backup storage system have information necessary to reconstruct the file system in a way that would be beneficial to the backup operation. There is nothing on either system capable of determining which blocks on the storage system correspond to particular files or to any files at all for that matter.

Accordingly, it is desirable to provide a mechanism that facilitates directly transferring files between a storage system and a backup storage system in a way that avoids having to use a host between the two to transfer the data.

SUMMARY OF THE INVENTION

According to the system described herein, transferring files directly from a storage system to a backup storage system includes determining identifiers for blocks on the storage system that correspond to files that are to be backed up, providing the identifiers for the blocks to the storage system, and the storage system pushing the blocks indicated by the identifiers directly from the storage system to the backup storage system. The identifiers may be logical block addresses. Determining the logical block addresses may vary according to a file system for files that are to be backed up. Determining the logical block address may include determining an inode value for each of the files that are to be backed up or may include determining a logical cluster number for each of the files that are to be backed up. The backup storage system may include a media server and a storage device. The storage system may push the blocks indicated by the identifiers directly from the storage system to the media server. A host computing system may determine identifiers for blocks on the storage system that correspond to files that are to be backed up. The host computing system, the backup storage system, and the storage system may be interconnected using a storage area network. The host computing system may use multi-path I/O to determine identifiers for blocks on the storage system that correspond to files that are to be backed up.

According further to the system described herein, a non-transitory computer readable medium contains software that transfers files directly from a storage system to a backup storage system. The software includes executable code that determines identifiers for blocks on the storage system that correspond to files that are to be backed up, executable code that provides the identifiers for the blocks to the storage system, and executable code that pushes the blocks indicated by the identifiers directly from the storage system to the backup storage system. The identifiers may be logical block addresses. Determining the logical block addresses may vary according to a file system for files that are to be backed up. Determining the logical block address may include determining an inode value for each of the files that are to be backed up or may include determining a logical cluster number for each of the files that are to be backed up. The backup storage system may include a media server and a storage device. The storage system may push the blocks indicated by the identifiers directly from the storage system to the media server. A host computing system may determine identifiers for blocks on the storage system that correspond to files that are to be backed up. The host computing system, the backup storage system, and the storage system may be interconnected using a storage area network. The host computing system may use multi-path I/O to determine identifiers for blocks on the storage system that correspond to files that are to be backed up.

BRIEF DESCRIPTION OF THE DRAWINGS

Embodiments of the system are described with reference to the several figures of the drawings, noted as follows.

DETAILED DESCRIPTION OF VARIOUS EMBODIMENTS

The system described herein provides a mechanism to directly back up data from a storage system to a backup storage system without requiring a host computing system (or similar) to read the data from the storage system and write the data back out to the backup storage system. Processing at the host determines blocks on the storage system corresponding to files that are to be backed up. Identification information for blocks to be backed is are passed to the storage system, which uses the information to directly push blocks to the backup storage system.

Figure 1:
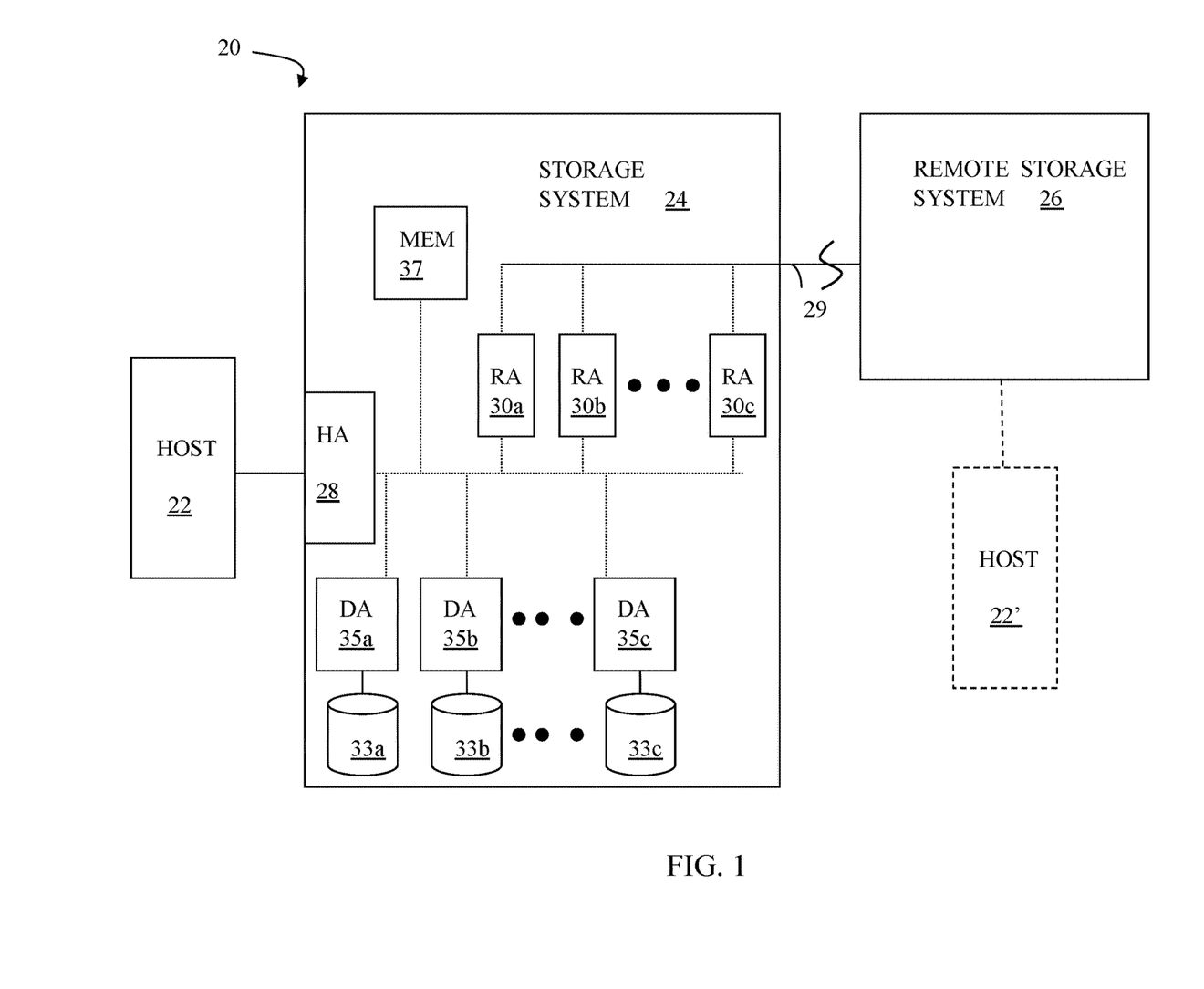
FIG. 1 is a schematic illustration showing a relationship between a host and a storage system that may be used in connection with an embodiment of the system described herein.

FIG. 1 is a diagram 20 showing a relationship between a host 22 and a storage system 24 that may be used in connection with an embodiment of the system described herein. In an embodiment, the storage system 24 may be a PowerMax, Symmetrix, or VMAX storage system produced by Dell EMC of Hopkinton, Mass.; however, the system described herein may operate with other appropriate types of storage systems. Also illustrated is another (remote) storage system 26 that may be similar to, or different from, the storage system 24 and may, in various embodiments, be coupled to the storage system 24, using, for example, a network. The host 22 reads and writes data from and to the storage system 24 via an HA 28 (host adapter), which facilitates an interface between the host 22 and the storage system 24. Although the diagram 20 shows the host 22 and the HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the storage system 24 may be copied to the remote storage system 26 via a link 29. For example, transferring data may be part of a data mirroring or replication process that causes data on the remote storage system 26 to be identical to the data on the storage system 24. Although only the one link 29 is shown, it is possible to have additional links between the storage systems 24, 26 and to have links between one or both of the storage systems 24, 26 and other storage systems (not shown). The storage system 24 may include a first plurality of remote adapter units (RA's) 30a, 30b, 30c. The RA's 30a-30c may be coupled to the link 29 and be similar to the HA 28, but are used to transfer data between the storage systems 24, 26.

The storage system 24 may include one or more physical storage units (including disks, solid state storage devices, etc.), each containing a different portion of data stored on the storage system 24. FIG. 1 shows the storage system 24 having a plurality of physical storage units 33a-33c. The storage system 24 (and/or remote storage system 26) may be provided as a stand-alone device coupled to the host 22 as shown in FIG. 1 or, alternatively, the storage system 24 (and/or remote storage system 26) may be part of a storage area network (SAN) that includes a plurality of other storage systems as well as routers, network connections, etc. (not shown in FIG. 1). The storage systems may be coupled to a SAN fabric and/or be part of a SAN fabric. The system described herein may be implemented using software, hardware, and/or a combination of software and hardware where software may be stored in a computer readable medium and executed by one or more processors.

Each of the physical storage units 33a-33c may be coupled to a corresponding disk adapter unit (DA) 35a-35c that provides data to a corresponding one of the physical storage units 33a-33c and receives data from a corresponding one of the physical storage units 33a-33c. An internal data path exists between the DA's 35a-35c, the HA 28 and the RA's 30a-30c of the storage system 24. Note that, in other embodiments, it is possible for more than one physical storage unit to be serviced by a DA and that it is possible for more than one DA to service a physical storage unit. The storage system 24 may also include a global memory 37 that may be used to facilitate data transferred between the DA's 35a-35c, the HA 28 and the RA's 30a-30c as well as facilitate other operations. The memory 37 may contain task indicators that indicate tasks to be performed by one or more of the DA's 35a-35c, the HA 28 and/or the RA's 30a-30c, and may contain a cache for data fetched from one or more of the physical storage units 33a-33c.

The storage space in the storage system 24 that corresponds to the physical storage units 33a-33c may be subdivided into a plurality of volumes or logical devices. The logical devices may or may not correspond to the storage space of the physical storage units 33a-33c. Thus, for example, the physical storage unit 33a may contain a plurality of logical devices or, alternatively, a single logical device could span both of the physical storage units 33a, 33b. Similarly, the storage space for the remote storage system 26 may be subdivided into a plurality of volumes or logical devices, where each of the logical devices may or may not correspond to one or more physical storage units of the remote storage system 26.

In some embodiments, another host 22' may be provided. The other host 22' is coupled to the remote storage system 26 and may be used for disaster recovery so that, upon failure at a site containing the host 22 and the storage system 24, operation may resume at a remote site containing the remote storage system 26 and the other host 22'. In some cases, the host 22 may be directly coupled to the remote storage system 26, thus protecting from failure of the storage system 24 without necessarily protecting from failure of the host 22.

Figure 2:
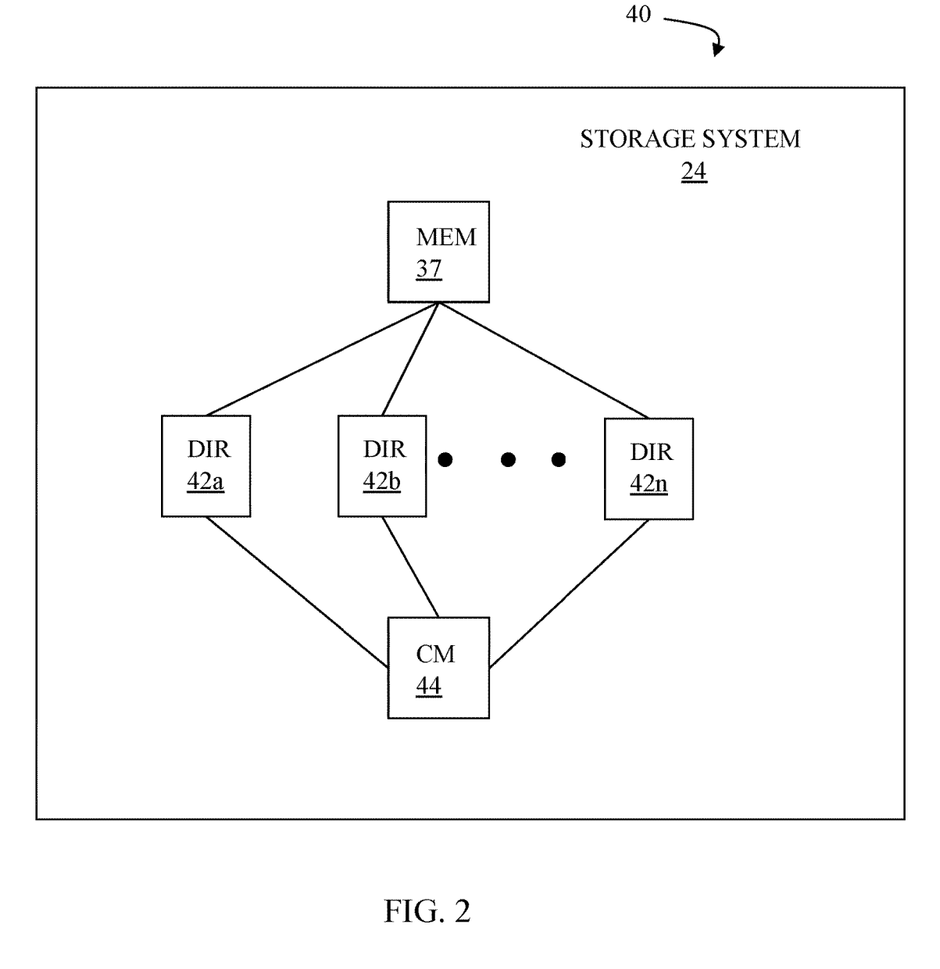
FIG. 2 is a schematic diagram illustrating an embodiment of a storage system where each of a plurality of directors are coupled to the memory according to an embodiment of the system described herein.

FIG. 2 is a schematic diagram 40 illustrating an embodiment of the storage system 24 where each of a plurality of directors 42a-42n are coupled to the memory 37. Each of the directors 42a-42n represents at least one of the HA 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 37. The CM 44 may be implemented using conventional MUX/router technology where one of the directors 42a-42n that is sending data provides an appropriate address to cause a message and/or data to be received by an intended one of the directors 42a-42n that is receiving the data. Some or all of the functionality of the CM 44 may be implemented using one or more of the directors 42a-42n so that, for example, the directors 42a-42n may be interconnected directly with the interconnection functionality being provided on each of the directors 42a-42n. In addition, one or more of the directors 42a-42n may be able to broadcast a message to all or at least some plurality of the other directors 42a-42n at the same time.

In some embodiments, one or more of the directors 42a-42n may have multiple processor systems thereon and thus may be able to perform functions for multiple discrete directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the storage system 24 may be provided as one or more director boards having CPUs, memory (e.g., DRAM, etc.) and interfaces with Input/Output (I/O) modules.

Note that, although specific storage system configurations are disclosed in connection with FIG. 1 and FIG. 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host systems with one or more storage systems in a manner that allows reconfiguring connections without having to physically disconnect and reconnect cables from and to ports of the devices. A storage area network may be implemented using one or more switches to which the storage systems and the host systems are coupled. The switches may be programmed to allow connections between specific ports of devices coupled to the switches. A port that can initiate a data-path connection may be called an "initiator" port while the other port may be deemed a "target" port.

Figure 3:
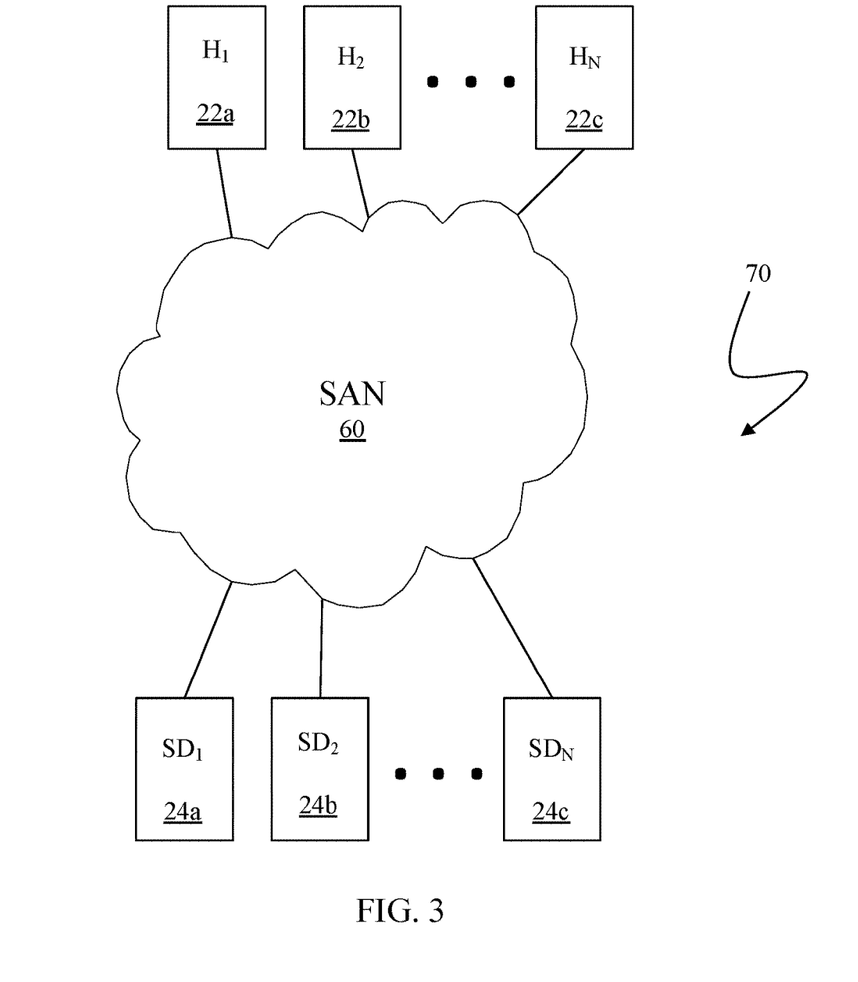
FIG. 3 is a schematic illustration showing a storage area network (SAN) providing a SAN fabric coupling a plurality of host systems to a plurality of storage systems that may be used in connection with an embodiment of the system described herein.

FIG. 3 is a schematic illustration 70 showing a storage area network (SAN) 60 providing a SAN fabric coupling a plurality of host systems ($H_1$-$H_N$) 22a-c to a plurality of storage systems ($SD_1$-$SD_N$) 24a-c that may be used in connection with an embodiment of the system described herein. Each of the devices 22a-c, 24a-c may have a corresponding port that is physically coupled to switches of the SAN fabric used to implement the storage area network 60. The switches may be separately programmed by one of the devices 22a-c, 24a-c or by a different device (not shown). Programming the switches may include setting up specific zones that describe allowable data-path connections (which ports may form a data-path connection) and possible allowable initiator ports of those configurations. For example, there may be a zone for connecting the port of the host 22a with the port of the storage system 24a. Upon becoming activated (e.g., powering up), the host 22a and the storage system 24a may send appropriate signals to the switch(es) of the storage area network 60, and each other, which then allows the host 22a to initiate a data-path connection between the port of the host 22a and the port of the storage system 24a. Zones may be defined in terms of a unique identifier associated with each of the ports, such as such as a world-wide port name (WWPN).

In various embodiments, the system described herein may be used in connection with performance data collection for data migration and/or data mirroring techniques using a SAN. Data transfer among storage systems, including transfers for data migration and/or mirroring functions, may involve various data synchronization processing and techniques to provide reliable protection copies of data among a source site and a destination site. In synchronous transfers, data may be transmitted to a remote site and an acknowledgement of a successful write is transmitted synchronously with the completion thereof. In asynchronous transfers, a data transfer process may be initiated and a data write may be acknowledged before the data is actually transferred to directors at the remote site. Asynchronous transfers may occur in connection with sites located geographically distant from each other. Asynchronous distances may be distances in which asynchronous transfers are used because synchronous transfers would take more time than is preferable or desired. Examples of data migration and mirroring products includes Symmetrix Remote Data Facility (SRDF) products from Dell EMC.

Figure 4A:
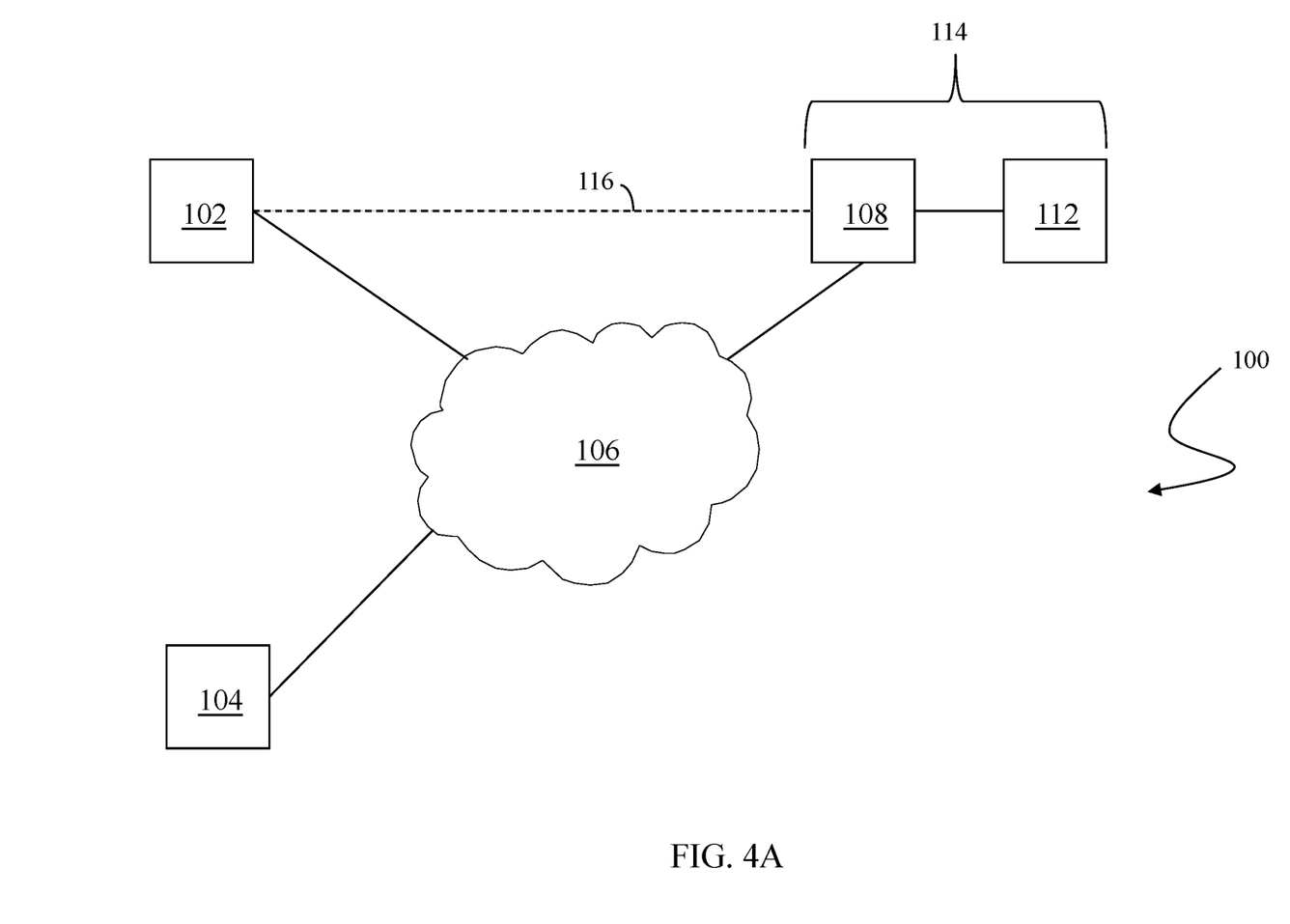
FIGS. 4A and 4B are schematic diagrams showing a data processing system containing a host, a storage system, and a backup storage system according to embodiments of the system described herein.

Referring to FIG. 4A, a diagram 100 shows a data processing system that includes a host 102 and a storage system 104. The host 102 is similar to the host 22, described elsewhere herein and the storage system 104 is similar to the storage system 24 described elsewhere herein. The host 102 and the storage system 104 may be coupled through a SAN 106, which is similar to the SAN 60, discussed elsewhere herein. The data processing system 100 also includes a media server 108 and backup storage 112. The media server 108 and the backup storage 112 form a backup storage system 114 that stores backup data from the storage system 104. Any type of backup storage system may be used with the system described herein, including a conventional, commercially-available backup storage system such as the Data Domain backup appliance provided by Dell EMC of Hopkinton, Mass. In some cases, the media server 108 may be a type of host with a file system and other components associated with a host. In some embodiments, an ethernet connection 116 may be provided between the host 102 and the media server 108 although, as described in more detail elsewhere herein, generally the ethernet connection 116 is not used/needed to transfer data from the storage system 104 that is being backed up.

In an embodiment herein, the host 102 determines data blocks on the storage system 104 that correspond to files on the storage system 104 that are to be backed up. The host 102 then provides the block information to the storage system 104, which pushes the blocks directly to the media server 108 via the SAN 106. The host 102 may also provide block information and other file system infrastructure information directly to the media server 108 either via the SAN 106 or using the (optional) ethernet connection 116 so that the backup storage system 114 may pull data from the storage system 104. In an embodiment herein, the multi-path I/O product (MPIO) provided by Dell EMC of Hopkinton, Mass. may be used to set up and facilitate the various transfers. As described in more detail elsewhere herein, MPIO, running on the host 102, may be used to determine blocks on the storage system 104 that correspond to files so that the blocks may be transferred directly from the storage system 104 to the backup storage system 114 in a correct order corresponding to ordering of blocks for each file.

Figure 4B:
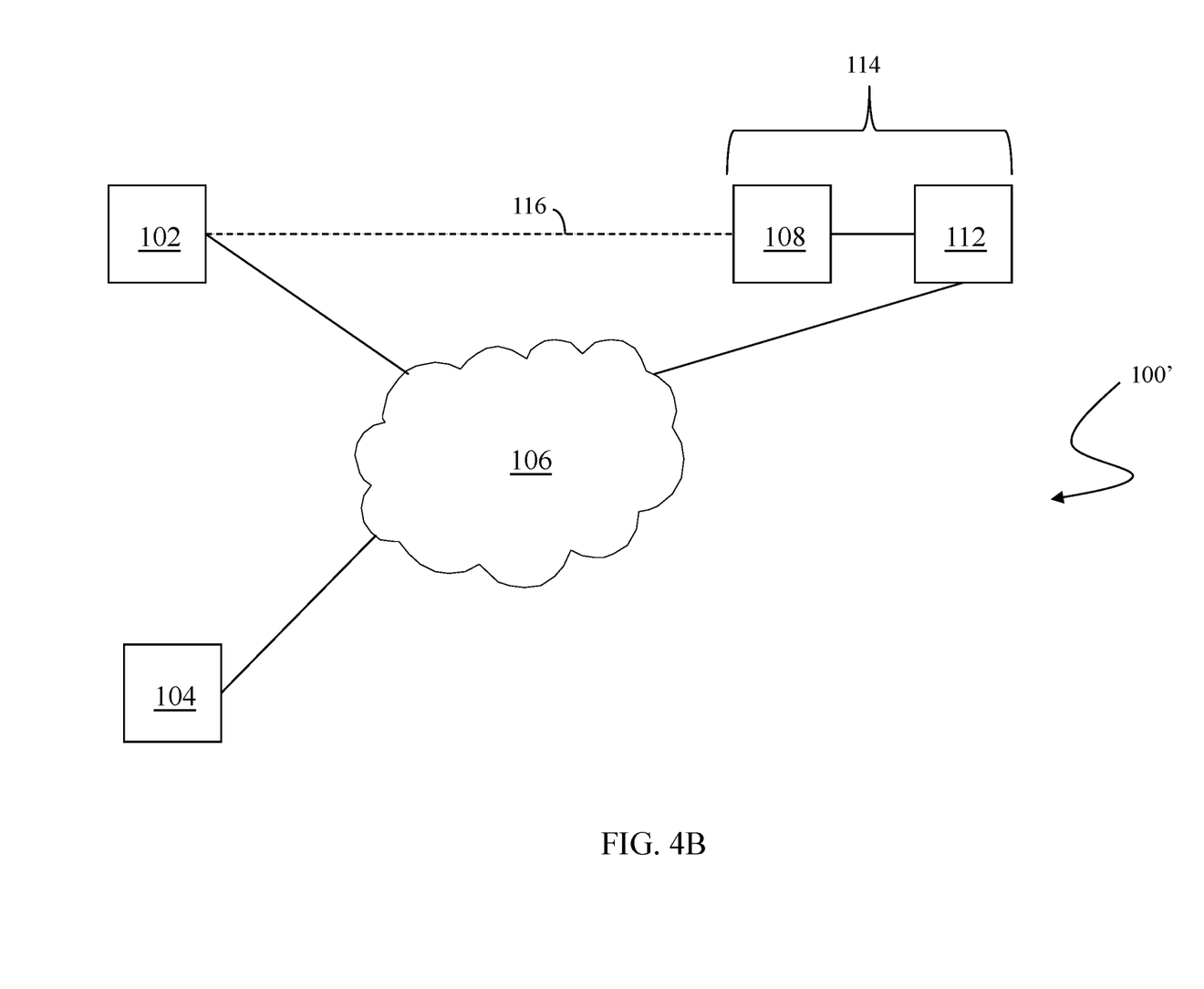

Referring to FIG. 4B, a diagram 100' shows an alternative embodiment where the backup storage 112 is coupled directly to the SAN 106 so that data is transferred directly from the storage system 104 to the backup storage 112. In the embodiment shown in FIG. 4B, the host 102 still provides block information to the storage system 104, but the storage system pushes the blocks directly to the backup storage 112 via the SAN 106. The host 102 may also provide block information and other file system infrastructure information directly to the media server 108 either via the SAN 106 or using the (optional) ethernet connection 116, but the media server 108 does not receive blocks for the files from the storage system 104. The embodiment of FIG. 4B may use the multi-path I/O product (MPIO) provided by Dell EMC of Hopkinton, Mass. to set up and facilitate the various transfers. Just as with the embodiment of FIG. 4A, MPIO may run on the host 102 and be used to determine blocks on the storage system 104 that correspond to files so that the blocks may be transferred directly from the storage system 104 to the backup storage system 114 in a correct order corresponding to ordering of blocks for each file. Note that, for both the embodiment of FIG. 4A and the embodiment of FIG. 4B, the SAN 106 may be replaced by direct connections so that the host is coupled directly to the storage system 104 and the storage system 104 is coupled either directly to the media server 108 (embodiment of FIG. 4A) or directly to the backup storage 112 (embodiment of FIG. 4B) or possibly both.

Figure 5:
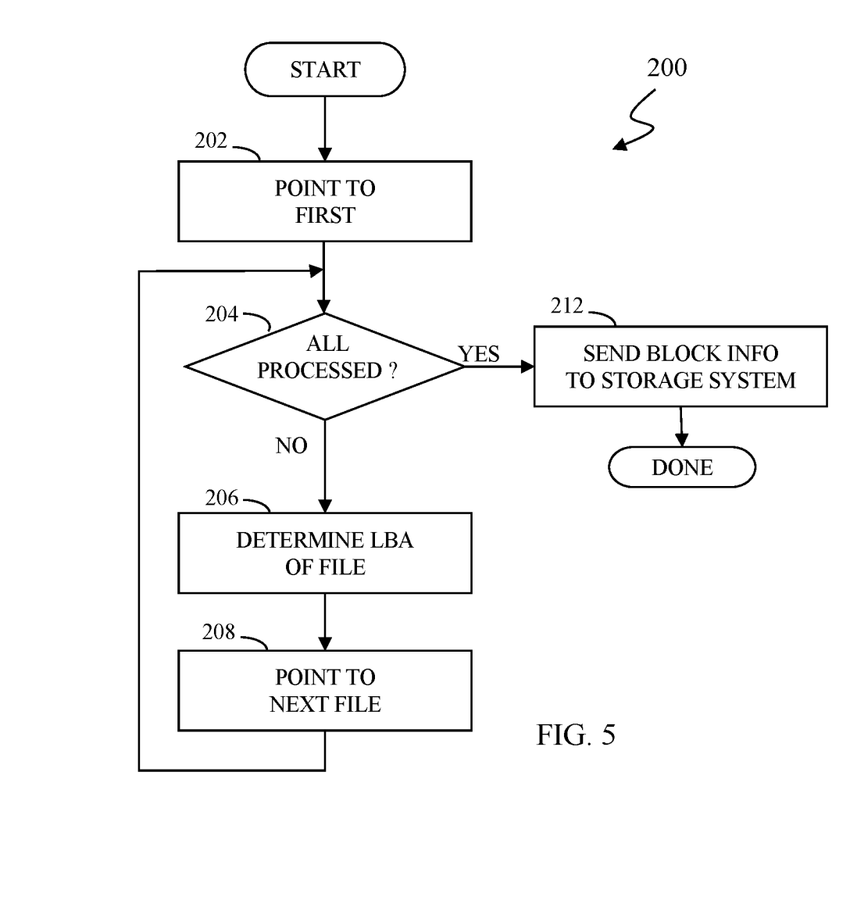
FIG. 5 is a flow diagram illustrating processing performed in connection with determining blocks corresponding to files to be backed up according to an embodiment of the system described herein.

Referring to FIG. 5, a flow diagram 200 illustrates processing performed on the host 102 in connection with determining blocks on the storage system 104 corresponding to files that are to be backed up. Processing begins at a first step 202 where an iteration pointer, that iterates though all of the files to be backed up, is initialized to point to a first one of the files to be backed up. Following the step 202 is a test step 204 where it is determined if all of the files being backed up have been processed. If not, then control transfers to a step 206 where logical block addresses are determined for the file indicated by the iteration pointer. Determining the logical block address (LBA) at the step 206 depends on the operating system used to store the files. For example, for a Unix/Linux system, the processing at the step 206 first determines the inode number of the file and then converts the inode number into a starting LBA and a plurality of subsequent LBAs, depending on the block size of the file system. For a Windows file system, first the logical cluster number (LCN) is determined followed by conversion of the LCN to an LBA and possibly subsequent LBAs, depending on the block size used by the file system. Note that it is also possible for a file to be non-contiguous so that there is more than one starting LBA and corresponding count for a single file. In an embodiment herein, MPIO running on the host 102 issues OS file system commands to obtain starting LBA and count values for each of the files.

Following the step 206 is a step 208 where the iteration pointer that is used to iterate through all of the files being backed up is incremented to point to a next file. Following the step 208, control transfers back to the step 204, discussed above, to determine if the iteration pointer indicates that all of the files to be backed up have been processed. If so, then control transfers from the test step 204 to a step 212 where the block identifiers that were obtained at the step 206, discussed above, are provided to the storage system 104. As discussed elsewhere herein, the block identifiers indicate all of the blocks on the storage system 104 (and the ordering thereof) that correspond to files that are to be backed up. Following the step 212, processing is complete. Note that, once the storage system 104 receives the block identifier information from the host 102 at the step 212, the storage system 104 can begin pushing the corresponding data blocks directly to the backup storage system 114.

Figure 6:
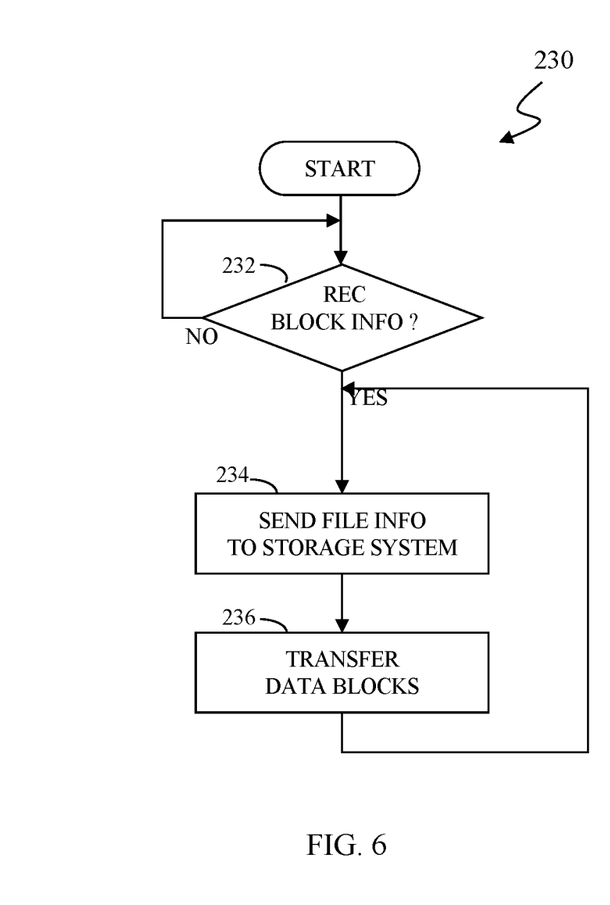
FIG. 6 is a flow diagram illustrating processing performed at a storage system in connection with transferring blocks directly to a backup storage system according to an embodiment of the system described herein.

Referring to FIG. 6, a flow diagram 230 illustrates processing performed at the storage system 104 in connection with receiving block identification information and transferring block data to a backup storage system. Processing begins at a first step 232 where it is determined if any block identifier information has been received. The block identifier information may be the block identifier information provided by the host 102 at the step 212, discussed above. If it is determined at the step 232 that no block identifier information has been received, then control transfers back to the step 232 in what is essentially a polling loop. If it is determined at the step 232 that block identifier information has been received, then control transfers from the step 232 to a step 234 where additional information that indicates which file starts where on the blocks of the storage system 104 is provided from the storage system 104 to the backup system 114. In some embodiments, the storage system 104 may execute a command (e.g., an SCSI command) to indicate to the backup system 114 that the blocks that are about to be pushed corresponding to specific file(s). Following the step 234 is a step 236 where data blocks corresponding to the block identifier information are directly transferred from the storage system 104 to the backup storage system 114, as described elsewhere herein. Following the step 236, control transfers back to the step 232 for another iteration.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of transferring files directly from a storage system to a backup storage system, comprising:
a host, coupled to the storage system, reading and writing data to and from logical devices of the storage system via a first path through a storage area network;
the host determining identifiers for logical blocks of the logical devices on the storage system that correspond to particular ones of the files that are to be backed up by iterating through a plurality of the logical blocks of the storage system to determine which of the logical blocks have changed;
the host providing, via a second path that is separate from the storage area network, the identifiers for all of the logical blocks to the storage system that have changed; and
the storage system pushing data corresponding to the logical blocks directly and without the host from the storage system to the backup storage system, wherein determining the addresses of the logical blocks varies according to an operating system used by the host to store files that are to be backed up and wherein the storage system pushes the data corresponding to the logical blocks to the backup storage system only after the host has provided the identifiers for all of the logical block that have changed.

2. A method, according to claim 1, wherein determining the identifiers for the logical blocks includes determining an inode value for each of the files that are to be backed up.

3. A method, according to claim 1, wherein determining the identifiers for the logical blocks includes determining a logical cluster number for each of the files that are to be backed up.

4. A method, according to claim 1, wherein the backup storage system includes a media server and a storage device.

5. A method, according to claim 4, wherein the storage system pushes the data corresponding to the logical blocks indicated by the identifiers directly from the storage system to the media server.

6. A method, according to claim 1, wherein the host, the backup storage system, and the storage system are interconnected using the storage area network and wherein the storage system pushes the logical blocks indicated by the identifiers through the storage area network via the first path through the storage area network.

7. A method, according to claim 1, wherein the host uses multi-path I/O to determine identifiers for logical blocks on the storage system that correspond to files that are to be backed up.

8. A non-transitory computer readable medium containing software that transfers files directly from a storage system to a backup storage system, the software comprising:
executable code on a host coupled to the storage system that reads and writes data to and from logical devices of the storage system via a first path through a storage area network;
executable code on the host that determines identifiers for logical blocks of the logical devices on the storage system that correspond to files that are to be backed up by iterating through a plurality of blocks of the storage system to determine which of the logical blocks have changed;
executable code on the host that provides, via a second path that is separate from the storage area network, the identifiers for the logical blocks to the storage system that have changed; and
executable code that pushes data corresponding to the logical blocks directly and without the host from the storage system to the backup storage system, wherein determining the addresses of the logical blocks varies according to an operating system used by the host to store files that are to be backed up and wherein the storage system pushes the data corresponding to the logical blocks to the backup storage system only after the host has provided the identifiers for all of the logical block that have changed.

9. A non-transitory computer readable medium, according to claim 8, wherein determining the identifiers for the logical blocks includes determining an inode value for each of the files that are to be backed up.

10. A non-transitory computer readable medium, according to claim 8, wherein determining the identifiers for the logical blocks includes determining a logical cluster number for each of the files that are to be backed up.

11. A non-transitory computer readable medium, according to claim 8, wherein the backup storage system includes a media server and a storage device.

12. A non-transitory computer readable medium, according to claim 11, wherein the storage system pushes the data corresponding to the logical blocks indicated by the identifiers directly from the storage system to the media server.

13. A non-transitory computer readable medium, according to claim 8, wherein the host, the backup storage system, and the storage system are interconnected using the storage area network and wherein the storage system pushes the logical blocks indicated by the identifiers through the storage area network via the first path through the storage area network.

14. A non-transitory computer readable medium, according to claim 8, wherein the host uses multi-path I/O to determine identifiers for logical blocks on the storage system that correspond to files that are to be backed up.

15. A data processing system, comprising:
a storage system;
a backup storage system coupled to the storage system; and
a host coupled to the storage system that reads and writes data to and from logical devices of the storage system via a first path through a storage area network and determines identifiers for logical blocks of the logical devices on the storage system that correspond to particular ones of the files that are to be backed up by iterating through a plurality of blocks of the storage system to determine which of the logical blocks have changed, the host providing, via a second path that is separate from the storage area network, identifiers for the logical blocks to the storage system that have changed, wherein the storage system pushes data corresponding to the logical blocks directly and without the host from the storage system to the backup storage system and wherein determining the addresses of the logical blocks varies according to an operating system used by the host to store files that are to be backed up and wherein the storage system pushes the data corresponding to the logical blocks to the backup storage system only after the host has provided the identifiers for all of the logical block that have changed.

16. A data processing system, according to claim 15, wherein the backup storage system includes a media server and a storage device.

17. A data processing system, according to claim 16, wherein the storage system pushes the data corresponding to the logical blocks indicated by the identifiers directly from the storage system to the media server.

18. A data processing system, according to claim 15, wherein the host, the backup storage system, and the storage system are interconnected using the storage area network and wherein the storage system pushes the logical blocks indicated by the identifiers through the storage area network via the first path through the storage area network.

19. A data processing system, according to claim 15, wherein the host uses multi-path I/O to determine identifiers for logical blocks on the storage system that correspond to files that are to be backed up.

\* \* \* \* \*